United States Patent [19]

Johnson et al.

[11] Patent Number: 4,890,493

[45] Date of Patent: Jan. 2, 1990

[54] AUTOMATIC TANK READING GAUGE

[76] Inventors: Robert M. Johnson, Box 1251, Clermont, Fla. 32711; George Spector, 233 Broadway RM 3815, New York, N.Y. 10007

[21] Appl. No.: 236,173

[22] Filed: Aug. 25, 1988

[51] Int. Cl.4 .............................................. G01F 23/30
[52] U.S. Cl. ........................................ 73/321; 73/305; 73/319; 116/228; 116/278
[58] Field of Search ................. 73/305, 309, 321, 314, 73/319, 290 B, 317, 290 R, 318; 116/228, 278, 282, 227

[56] References Cited

U.S. PATENT DOCUMENTS

| | | | |
|---|---|---|---|
| 572,321 | 12/1896 | Vleck | 73/321 |
| 675,307 | 5/1901 | Voltzow et al. | 73/321 |
| 1,767,641 | 6/1930 | Anschicks | 73/321 |
| 1,866,902 | 7/1932 | Overmire | 73/321 |
| 4,092,861 | 6/1978 | Fling | 73/321 |
| 4,147,060 | 4/1979 | Fling et al. | 73/321 |
| 4,154,103 | 5/1979 | Fling | 73/305 |
| 4,709,653 | 12/1987 | Salomon | 116/228 |

FOREIGN PATENT DOCUMENTS

| | | | |
|---|---|---|---|
| 498807 | 10/1919 | France | 73/321 |
| 1219071 | 12/1959 | France | 73/321 |
| 340142 | 3/1936 | Italy | 116/118 |
| 347188 | 4/1937 | Italy | 116/118 |

Primary Examiner—Allan N. Shoap
Assistant Examiner—Jeffrey J. Hohenshell

[57] ABSTRACT

An automatic reading gauge is provided and consists of an elongated flexible measuring member having a scale thereon with a float affixed to one end and a counterweight at other end. The measuring member is disposed within an O-shaped body having a weep hole, an air check valve and a top sight area. When the body is placed through a filler hole to extend to bottom of a tank, the amount of fluid within the tank will be indicated at the top sight area.

4 Claims, 2 Drawing Sheets

AUTOMATIC TANK READING GAUGE

BACKGROUND OF THE INVENTION

The instant invention relates generally to fluid fill indicator devices and more specifically it relates to an automatic tank reading gauge.

Numerous fluid fill indicator devices have been provided in prior art that are adapted to measure the amount of fluid within receptacles that receive the fluid. For example, U.S. Pat. Nos. 3,240,064, 3,630,083 and 4,061,901 all are illustrative of such prior art. While these units may be suitable for the particular purpose to which they address, they would not be as suitable for the purposes of the present invention as heretofore described.

SUMMARY OF THE INVENTION

A primary object of the present invention is to provide an automatic tank reading gauge that will overcome the shortcomings of the prior art devices.

Another object is to provide an automatic tank reading gauge that can be set into an inground tank simply by lowering the gauge into the tank like a normal measuring stick.

An additional object is to provide an automatic tank reading gauge that is adjustable to meet the exact height from top to bottom of a tank.

A further object is to provide an automatic tank reading gauge that is simple and easy to use.

A still further object is to provide an automatic tank reading gauge that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
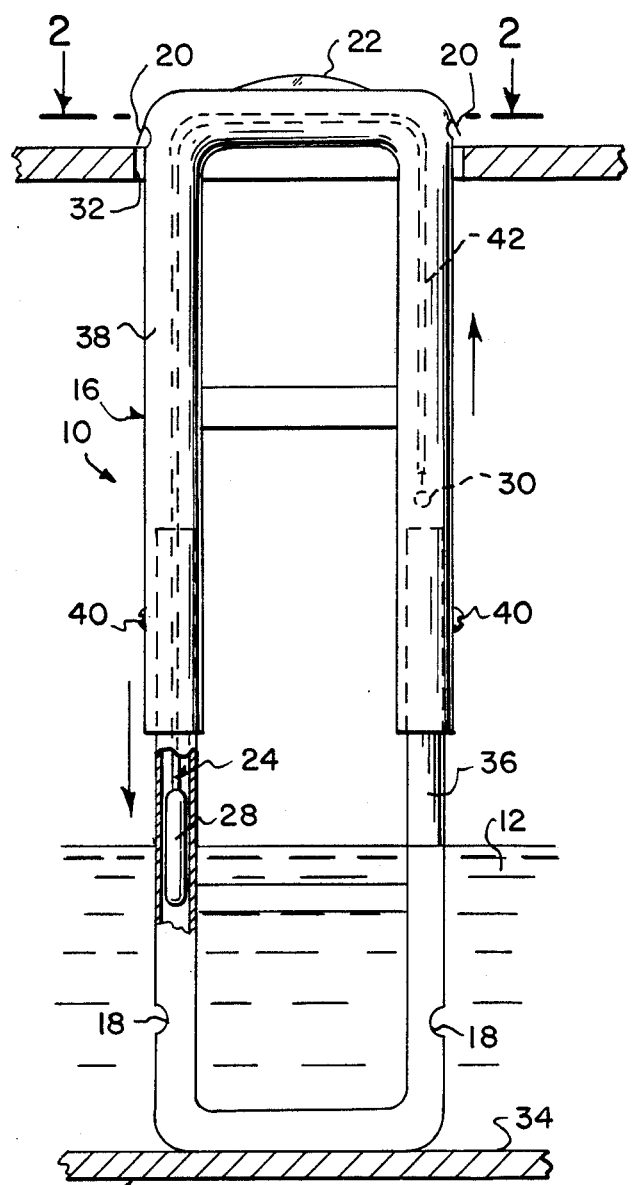
FIG. 1 is a front elevational view of the invention installed within a fuel tank with parts broken away.

Turning now descriptively to the drawings, in which similar reference characters denote similar elements throughout the several views, the figures illustrate an automatic reading gauge 10 for fluid 12, such as fuel or the like, within a tank 14. The gauge 10 consists of an 0-shaped hollow body 16 having weep holes 18 at lower end to allow the fluid 12 to enter the body 16, air check valves 20 at upper end to allow air to exit the body 16 and a top sight area 22. An elongated flexible measuring member 24 is provided having a scale 26 thereon. The measuring member 24 is disposed within the body 16 so that the scale 26 can be viewed through the top sight area 22. A float 28 is affixed to one end of the measuring member 24 within the body 16 while a counter weight 30 is affixed to other end of the measuring member 24 within the body 16 to keep the measuring member 24 taut so that when the body 16 is placed through a filler hole 32 in the tank 14 to extend to bottom 34 of the tank the fluid 12 entering the body 16 will cause the float 28 to rise giving a reading on the scale 26 of the measuring member 24 at the sight area 22 thus indicating the amount of fluid 12 within the tank 14.

The body 16 is telescopic and includes a lower hollow U-shaped tubular member 36 having the weep holes 18 therein and an upper hollow U-shaped tubular member 38 having the air check valves 20 and the top sight area 22 therein. The ends of the upper tubular member 38 fits into ends of the lower tubular member 36 so as to be adjustable to compensate for different height tanks 14. A pair of set screws 40 are for locking the ends of the upper tubular member 38 to the ends of the lower tubular member 36.

Figure 3:
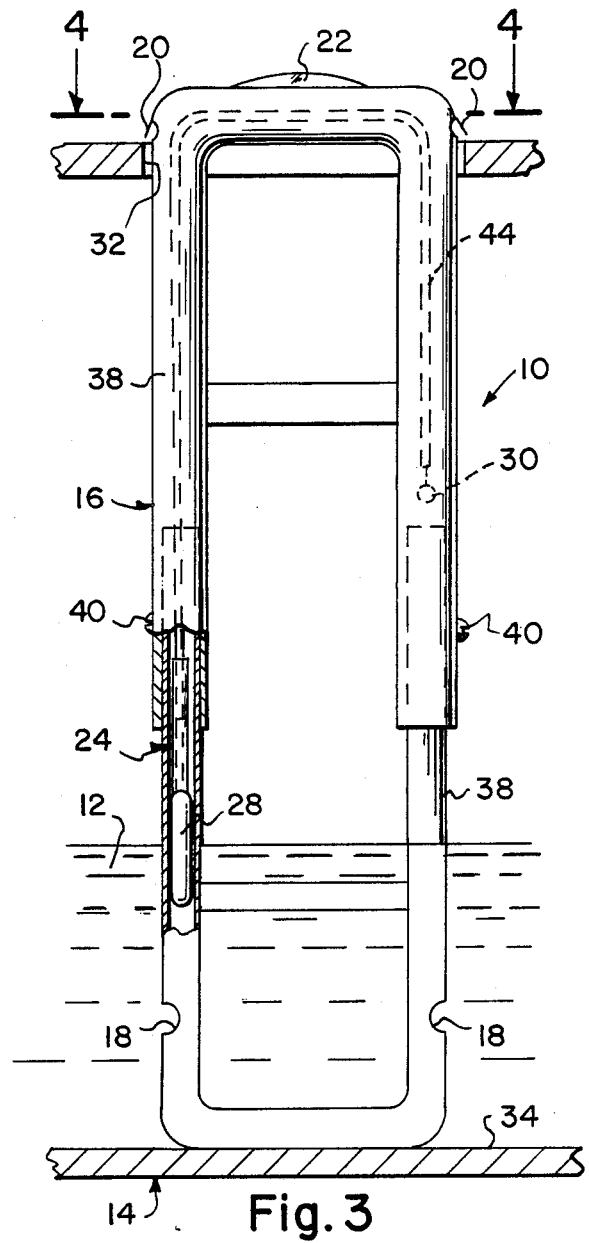
FIG. 3 is a front elevational view of a first modification installed within a fuel tank with parts broken away utilizing an adjustable measuring tube.
Figure 2:
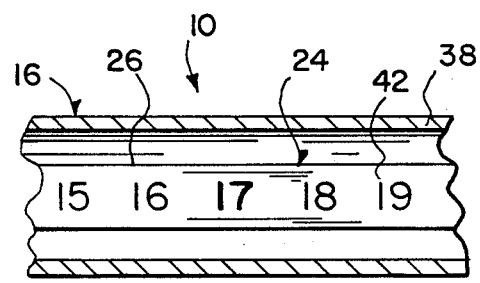
FIG. 2 is a cross sectional view taken along line 2—2 in FIG. 1 showing the measuring tape in greater detail.
Figure 4:
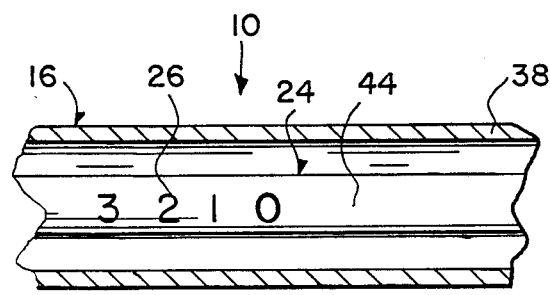
FIG. 4 is a cross sectional view taken along line 4—4 in FIG. 3 showing the measuring tube in greater detail.

As shown in FIGS. 1 and 2 the measuring member 24 is a tape 42 having the scale 26 disposed thereon. The measuring member 24 as shown in FIGS. 3 and 4 is a telescopic bendable tube 44 having the scale 26 disposed thereon.

Figure 5:
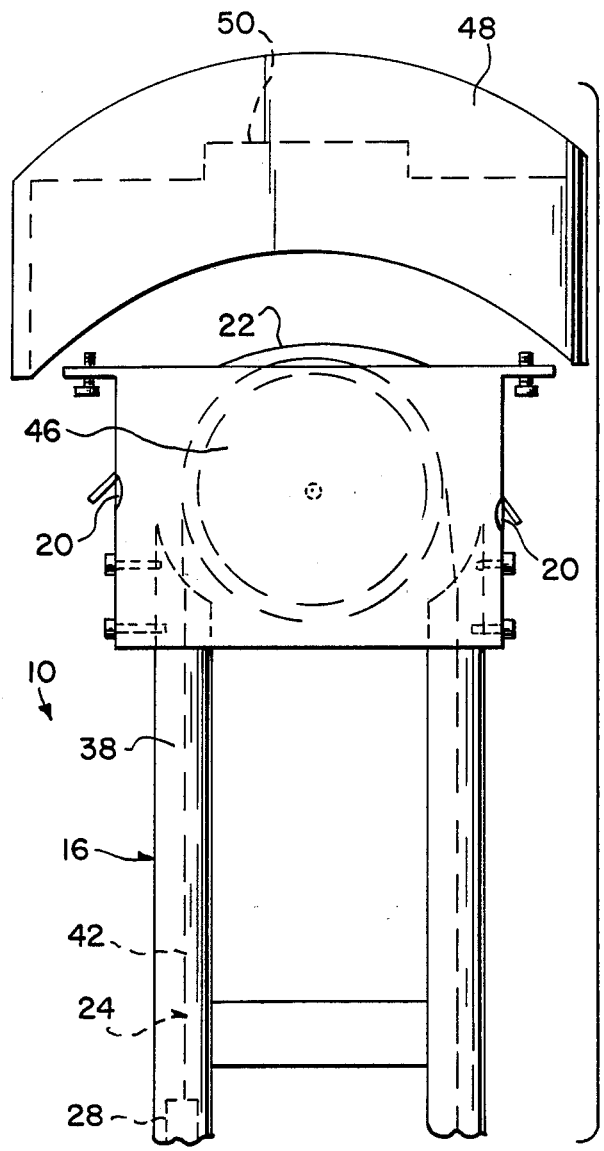
FIG. 5 is a front elevational view of a second modification with parts broken away having a rotatable spool head assembly with an optional filler cap that can be attached thereto.
Figure 6:
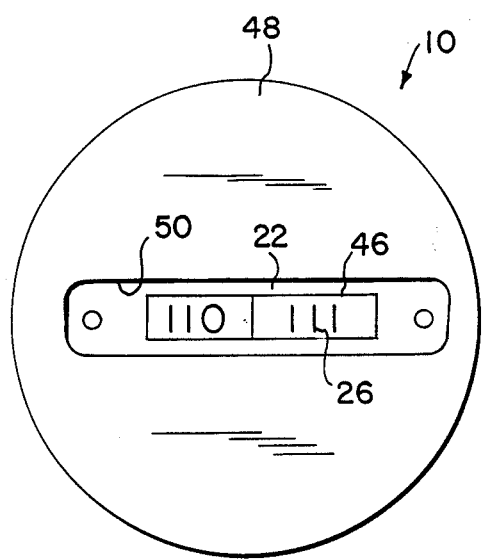
FIG. 6 is a top view taken in direction of arrow 6 in FIG. 5.
Figure 7:
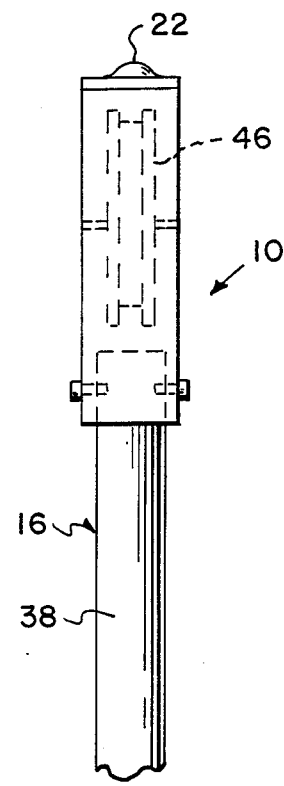
FIG. 7 is a side view taken in direction of arrow 7 in FIG. 5 with the filler cap removed therefrom.

As shown in FIGS. 5, 6 and 7 the gauge 10 further includes a rotatable spool head assembly 46 disposed within the upper tubular member 38 below the top sight area 22 to carry the tape 42 so as to be properly viewed therefrom through the top sight area 22.

A filler cap 48 having an aperture 50 therethrough is attachable to the spool head assembly 46, as shown in FIGS. 5 and 6, so that the aperture 50 is over the top sight area 22 for ease of reading the amount of fluid 12 within the tank 14.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automatic reading gauge for fluid within a tank comprising:
    (a) an O-shaped hollow body having at least one weep hole at a lower end to allow the fluid to enter said body, at least one air check valve at an upper end to allow air to exit said body and a top sight area;
    (b) an elongated flexible measuring member having a scale thereon, said measuring member disposed with said body so that said scale can be viewed through said top sight area;
    (c) a float affixed to one end of said measuring member within said body;
    (d) a counterweight affixed to other end of said measuring member within said body to keep said measuring member taut so that when said body is placed through a filler hole in the tank to extend to bottom of the tank the fluid entering said body will cause said float to rise giving a reading of said scale of said measuring member at said sight area thus indicating the amount of fluid within the tank; wherein said body is telescopic and includes:
(e) a lower hollow U-shaped tubular member having said at least one weep hole therein;
(f) an upper hollow U-shaped tubular member having said at least one air check valve and said top sight area therein, ends of said upper tubular member fits into ends of said lower tubular member so as to be adjustable to compensate for different height tanks; and
(g) a pair of set screws for locking the ends of said upper tubular member to the ends of said lower tubular member.

2. An automatic reading gauge as recited in claim 1, wherein said measuring member is a tape having said scale disposed thereon.

3. An automatic reading gauge as recited in claim 1 wherein said measuring member is a telescopic bendable tube having said scale disposed thereon.

4. An automatic gauge as recited in claim 2, further including a rotatable spool head assembly disposed within said upper tubular member below said top sight area to carry said tape so as to be properly viewed therefrom through said top sight area.

* * * * *